US011005551B1

(12) United States Patent
Leung

(10) Patent No.: US 11,005,551 B1
(45) Date of Patent: May 11, 2021

(54) SYSTEMS AND METHODS FOR RF-BASED MOTION SENSING AND EVENT DETECTION

(71) Applicant: Verizon Patent and Licensing Inc., Basking Ridge, NJ (US)

(72) Inventor: Steve Leung, Randolph, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/984,302

(22) Filed: Aug. 4, 2020

(51) Int. Cl.
*H04B 7/06* (2006.01)
*H04W 72/04* (2009.01)

(52) U.S. Cl.
CPC ......... *H04B 7/0641* (2013.01); *H04B 7/0626* (2013.01); *H04W 72/0453* (2013.01)

(58) Field of Classification Search
CPC ............... H04B 7/0641; H04B 7/0626; H04W 72/0453
See application file for complete search history.

(56) References Cited

U.S. PATENT DOCUMENTS

| 2017/0212210 A1* | 7/2017 | Chen ......................... G01S 5/06 |
| 2019/0251138 A1* | 8/2019 | Patton .................. G06F 16/9537 |
| 2020/0319324 A1* | 10/2020 | Au ............................. G01S 7/006 |

OTHER PUBLICATIONS

Y. Ma, "WiFi Sensing with Channel State Information: A Survey," College of William & Mary (available at http://www.cs.wm.edu/~yma/files/WiFiSensing_YongsenMa_authorversion.pdf, visited Jul. 17, 2020). Jun. 2019.
B. Aboba et al., "Extensible Authentication Protocol (EAP)," Network Working Group Request for Comments 3748, Jun. 2004 (available at http://www.ietf.org/rfc/rfc3748.pdf, visited Aug. 4, 2020).
D. Simon et al., "The EAP-TLS Authentication Protocol," Network Working Group Request for Comments 5216, Mar. 2008 (available at http://www.ietf.org/rfc/rfc5216.pdf, visited Aug. 4, 2020).
Cisco, "Understand and configure EAP-TLS using WLC and ISE," (available at https://www.cisco.com/c/en/us/support/docs/wireless-mobility/wireless-lan-wlan/213543-configure-eap-tls-flow-with-ise.html, visited Jul. 28, 2020). Jul. 2020.

\* cited by examiner

*Primary Examiner* — Vineeta S Panwalkar

(57) ABSTRACT

A system described herein may determine transformations, differences, variations, etc. in radio frequency ("RF") waveforms sent by a device in order to detect motion-based events. Models associated with the differences in such RF waveforms may be used to identify particular types of events, such as the presence of an individual in a room or other area, a type of motion, or other types of events. An interval or rate at which the device outputs RF waveforms may be modified, in order to increase the resolution of the determination of differences between the RF waveforms as sent and the RF waveforms as received, and/or to conserve power.

20 Claims, 10 Drawing Sheets

… (1)

SYSTEMS AND METHODS FOR RF-BASED MOTION SENSING AND EVENT DETECTION

BACKGROUND

Radio frequency ("RF") signals, such as signals emitted or received by wireless devices (e.g., wireless telephones, WiFi routers, Internet of Things ("IoT") devices, etc.) may exhibit transformations, anomalies, when reflecting off of or passing through objects that are within a propagation path associated with such RF signals.

DETAILED DESCRIPTION OF THE PREFERRED EMBODIMENTS

Figure 1:
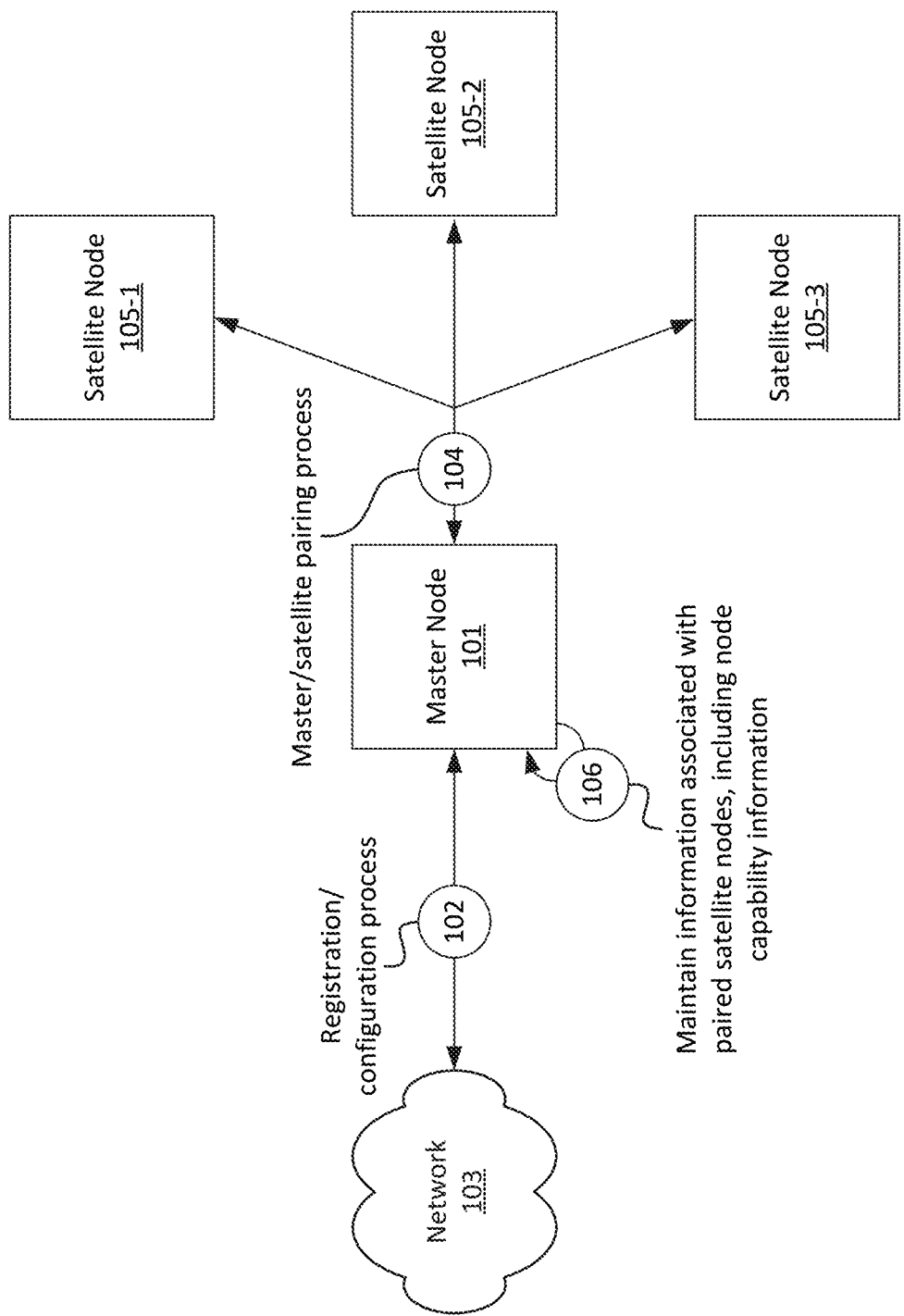
FIG. 1 illustrates an example of a registration process of a master node and a group of satellite nodes, in accordance with some embodiments.

The following detailed description refers to the accompanying drawings. The same reference numbers in different drawings may identify the same or similar elements.

Embodiments described herein provide for the detection of events (e.g., motion-based events) based on variations, transformations, etc. of RF signals sent by one or more sending devices to one or more receiving devices. For example, a sending device may wirelessly send traffic to the receiving device, where the traffic includes information describing an RF waveform corresponding to the traffic as sent by the sending device. Such information may be included as header information (e.g., a preamble) of the traffic and/or may otherwise be provided to the receiving device. The receiving device may compare the RF waveform, as received, to the RF waveform as originally transmitted (e.g., as indicated in the header information, preamble, etc.). Generally, the received RF waveform may exhibit differences from the RF waveform as originally transmitted, which may be due to scattering, fading, reflections, power decay, and/or other changes associated with the transmission of the RF waveforms. Such changes to the RF waveforms as sent may be quantified or described as channel state information ("CSI") and/or in some other suitable manner. In some embodiments, the RF signals may include WiFi signals, and may include connection-based traffic (e.g., traffic sent by the transmitting device to the receiving device) or connectionless traffic (e.g., broadcasts, beacons, or the like transmitted by the transmitting device, without a specified particular recipient or destination).

As described herein, some embodiments may include generating or modifying models (e.g., using machine learning, artificial intelligence ("AI"), and/or other suitable techniques) based on the CSI information (and/or other suitable information indicating variations on RF waveforms as sent by a sending device and received by a receiving device). Such models may be used to identify particular types of events, such as the presence of an individual in a room or other area, a type of motion (e.g., an individual falling abruptly, an individual walking into or out of a room, breathing and/or sleeping patterns of an individual, etc.), and/or other types of motion-based events. Further, one or more devices of some embodiments may output alerts when events are detected, such as alerts sent to a "smart home" portal, alerts sent to an IoT hub, alerts sent to a device (e.g., mobile telephone, tablet computer, etc.) associated with an individual, alerts sent to a transmitting device from which RF signals were received (where such device may have a display screen, speaker, or other type of output device), and/or one or more other devices or systems.

As further described herein, the use of dedicated devices to send and/or receive RF signals, determine CSI values, detect motion, etc. may be advantageous in that such devices may be situated or placed in an environment (e.g., a room, a house, a facility, etc.) such that the RF signals propagate the entire environment. Further, as some embodiments make use of dedicated devices that are purpose-built for the functionality described herein (e.g., the sending and/or receiving of RF signals for the purposes of detecting motion, outputting alerts, etc.), such devices may be provided at lower cost than devices with additional functionality that is not necessarily related to the functions described herein.

As shown in FIG. 1, master node 101 may be connected to network 103. For example, network 103 may be the Internet or some other type of network, via which master node 101 may communicate with one or more other devices or systems (e.g., a "smart home" portal, an application server, a User Equipment ("UE") such as mobile telephone, and/or another device or system). As discussed herein, master node 101 may be described as communicating "with" or "via" a network (e.g., network 103). In practice, such communications "with" or "via" a network may be communications with one or more other devices or systems that are also communicatively coupled to, or otherwise reachable via, the network (e.g., an application server, UE, etc.).

Master node 101 may perform (at 102), or participate in, a registration and/or configuration process. For example, master node 101 may communicate (e.g., via network 103) with one or more devices or systems. As discussed below, such devices or systems may perform, or may aid with, the generation, modification, analysis, etc. of models based on analysis of RF signals received by master node 101 from one or more satellite nodes 105. For example, the registration process (at 102) may include master node 101 notifying such devices or systems of a locator (e.g., Internet Protocol ("IP") address) of master node 101, via which master node 101 may be reached via network 103. In some embodiments, the registration process (at 102) may include master node 101 receiving one or more models, based on which master node

101 may detect motion in a location proximate to master node 101 (e.g., based on RF signals received from one or more satellite nodes 105).

Master node 101 may also perform (at 104), or participate in, a pairing process with one or more satellite nodes 105. In the examples described herein, master node 101 is described as pairing with three example satellite nodes 105-1, 105-2, and 105-3. In practice, master node 101 may pair with fewer satellites nodes 105, and/or may pair with a greater quantity of satellite nodes 105.

For example, master node 101 and satellite nodes 105 may use Extensible Authentication Protocol ("EAP") messaging, Transport Layer Security ("TLS") messaging, WiFi Protected Access ("WPA") messaging, WPA2 messaging, and/or one or more other types of messaging, protocols, techniques, application programming interfaces ("APIs"), etc. in order to create a communication pathway between master node 101 and each one of satellite nodes 105. Such communication pathways may include a WiFi link, connection, or the like between master node 101 and each of satellite nodes 105 (e.g., according to a Institute of Electrical and Electronics Engineers ("IEEE") 802.11 standard, IEEE 802.1X standard, or some other suitable standard, protocol, or the like). In some embodiments, the pairing process between master node 101 and a particular satellite node 105 may occur in response to powering on satellite node 105 (e.g., plugging in satellite node 105 to a power source, such as an alternating current ("AC") power outlet, a direct current ("DC") power source such as a battery, etc.), a button press on satellite node 105 (e.g., where satellite node 105 may include a button that causes satellite node 105 to initiate a discovery and/or pairing process with master node 101), a button press on master node 101 (e.g., where master node 101 may include a button that causes master node 101 to perform a discovery and/or pairing process with one or more satellite nodes 105), and/or in response to some other type of trigger or event.

The discovery and/or pairing process (at 104) may include the use of a pre-configured set of broadcast signals, beacons, identifiers, or the like. In some embodiments, master node 101 may broadcast a particular Service Set Identifier ("SSID"), and/or a SSID that matches a pre-configured pattern. For example, master node 101 may implement a WiFi network with an SSID that matches the pattern "Node_XXXX" where "XXXX" represents a variable set of characters. In some embodiments, the SSID may be "hidden," in that devices that are scanning for available networks may not discover the WiFi network implemented by master node 101 unless such devices scan for the particular hidden SSID. For example, satellite nodes 105 may scan for SSIDs matching the pre-configured pattern "Node_XXXX" by scanning for different SSIDs that match the pattern. For example, satellite nodes 105 may scan for the SSIDs "Node_0000", "Node_0001", "Node_0002", and so on, until the particular SSID of the network implemented by master node 101 is discovered. In some embodiments, satellite nodes 105 and master node 101 may have been pre-configured with the same SSID (e.g., by a vendor or manufacturer prior to deployment), such that satellite nodes 105 are pre-configured to scan for the SSID of the hidden network implemented by master node 101. In some embodiments, satellite nodes 105 and/or master node 101 may be associated with an API, portal, etc. via which the SSID can be configured (e.g., the SSID as implemented by master node 101 and/or as scanned for by satellite node 105).

In some embodiments, such SSID (or set of potential SSIDs) may be associated with a user account or profile, such that a user associated with master node 101 and satellite nodes 105 may access the SSID using a wireless phone, tablet computer, laptop computer, or other suitable device (e.g., a device that has WiFi capability). For example, the user's device may access an API, web portal, or other interface associated with the user account or profile, via which the SSID of the hidden WiFi network implemented by master node 101 may be provided to the users' device. The user's device may be able to accordingly scan for WiFi signals associated with the SSID of the hidden WiFi network. As a result of the scanning, the device may be able to identify areas in which wireless coverage of satellite nodes 105 and/or master node 101 is relatively weak.

Accordingly, the user may be informed of potential areas in which the installation or deployment of additional satellite nodes 105 and/or master node 101 may provide enhanced coverage. For example, while described below in the context of a single master node 101, in practice, multiple master nodes 101 may be deployed, such as situations where a single master node 101 may not have sufficient coverage area to communicate with satellite nodes 105 in a desired area.

Master node 101 and satellite nodes 105 may each be associated with one or more certificates, keys, identities, and/or other suitable authentication mechanisms by which master node 101 and satellite nodes 105 may securely pair (at 104) with each other, and/or otherwise communicate with one another. Such authentication mechanisms may include EAP-related authentication mechanisms (e.g., EAP identities or other suitable EAP mechanisms), TLS-related authentication mechanisms (e.g., TLS certificates, TLS keys, and/or other suitable TLS mechanisms), or authentication mechanisms associated with other authentication protocols or procedures. For example, such certificates, keys, identities, etc. may be installed by a vendor, manufacturer, etc. prior to deployment of master node 101 and/or satellite nodes 105. In some embodiments, satellite nodes 105 and/or master node 101 may be associated with an API, portal, etc. via which such certificates, keys, identities, etc. can be configured.

In some embodiments, the pairing process (at 104) may include a determination of a location of each satellite node 105, such as a relative location with respect to master node 101 (e.g., a distance from master node 101), and/or an absolute location (e.g., a location within a house and/or a room). In some embodiments, master node 101 may receive input (e.g., from a user) indicating a location of a particular satellite node 105. For example, after a particular satellite node 105 is paired with master node 101, master node 101 (or some other device or system) may present one or more options for a user to indicate a location of satellite node 105, such as "kitchen," "bedroom," etc. In some embodiments, such information may be provided to a "smart home" hub, application server, etc. (e.g., via network 103).

The pairing process (at 104) may also include a determination of device capability information associated with each particular satellite node 105, such as an indication of types of output devices or capabilities associated with satellite node 105. For example, some instances of satellite node 105 may include a speaker, display screen, light (e.g., light emitting diode ("LED") or other type of light), and/or other type of output device, while other instances of satellite node 105 may not include one or more of such output devices, or may include other types of output devices. As such, flexibility may be provided to individuals based on types of capabilities associated with each instance of satellite node 105, which may allow for individuals to select devices with greater sets of capabilities or functionality when desired, and/or to select devices with fewer capabilities or functions in order to save cost or utilize a smaller form factor for satellite node 105. In some embodiments, satellite node 105 may indicate capabilities of satellite node 105 by indicating such capabilities to master node 101 when pairing (at 104) with master node 101. Additionally, or alternatively, master node 101 may obtain device capability information (e.g., via network 103) from some other device or system, based on a device type or other information provided by satellite node 105 during the pairing process.

Master node 101 may maintain (at 106) information associated with the paired satellite nodes 105, including node capability information. As discussed below, such information may be used when analyzing RF signals received from respective satellite nodes 105, and/or when outputting alerts to one or more satellite nodes 105. In some embodiments, master node 101 may output such information (e.g., via network 103) to one or more other devices or systems, such as a "smart home" hub, application server, or the like.

Figure 2:
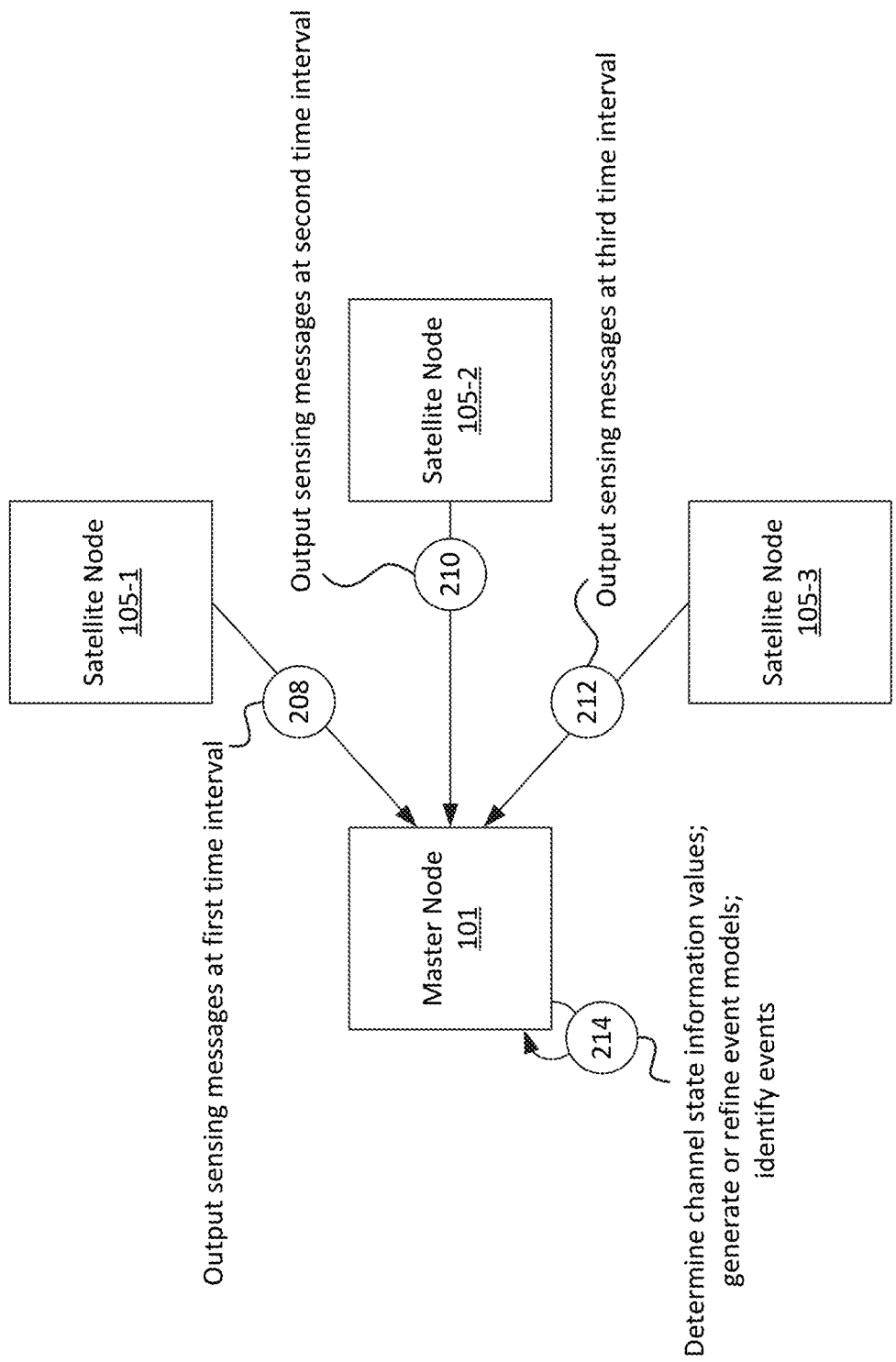
FIG. 2 illustrates an example detection of events (e.g., motion-based events) based on RF signals monitored and/or emitted by one or more satellite nodes, in accordance with some embodiments.

As shown in FIG. 2, satellite nodes 105 may output (at 208-212) sensing messages to master node 101. For example, satellite node 105-1 may output (at 208) sensing messages at a first time interval, satellite node 105-2 may output (at 210) sensing messages at a second time interval, and satellite node 105-3 may output (at 212) sensing messages at a third time interval. In some embodiments, the first, second, and third time intervals may be the same time interval (e.g., every second, 10 sensing messages per second, 150 sensing messages per second, 2,000 sensing messages per second, and/or some other suitable interval). In some embodiments, one or more of the first, second, or third time intervals may be different (e.g., the first time interval may be sensing messages sent every second, the second time interval may be sensing messages sent 150 times per second, and the third time interval may be sensing messages sent 2,000 times per second). As discussed below, the time intervals for different satellite node 105 may be set differently, in order to enhance the ability to sense motion based on the received signals (e.g., a greater quantity of sensing messages sent over time), or to reduce power consumption (e.g., a lesser quantity of sensing messages sent over time).

In some embodiments, the sensing messages (sent by respective satellite nodes 105 at 208-212) may be sent over WiFi or some other suitable RF communication (e.g., via an unlicensed frequency band or set of frequency bands) to master node 101. In some embodiments, the sensing messages may be broadcast messages or beacons, which may not necessarily include address or recipient data (e.g., may not explicitly identify master node 101). In some embodiments, the sensing messages may include header information, metadata, a preamble, or other suitable information that indicates, or may be used to determine, an RF waveform associated with each sensing message as outputted by a respective satellite node 105. For example, satellite nodes 105 may each include digital-to-analog converters ("DACs") that convert digital data (e.g., logical information that represents the sensing messages) to analog, or physical layer ("PHY") data, such as an RF waveform. The PHY layer data may be indicated or suitably represented in the sensing messages (e.g., as a hash that represents the RF waveform or in some other suitable manner), such that a recipient of the sensing messages (e.g., master node 101, in some embodiments) may identify, determine, derive, etc. the RF waveforms as outputted by respective satellite nodes 105.

For example, master node 101 may determine (at 214) CSI values associated with the received RF waveforms (e.g., associated with the received sensing messages from satellite nodes 105), by comparing the RF waveforms as received to the RF waveforms as transmitted from satellite nodes 105 (e.g., as indicated by the header information, preambles, etc.). Master node 101 may generate or refine models associated based on received CSI values over time. Such models may indicate, for example, the presence of objects, people, animals, walls, and/or other types of objects in between respective satellite nodes 105 and master node 101, and/or otherwise in the vicinity of satellite nodes 105 and/or master node 101.

Figure 3:
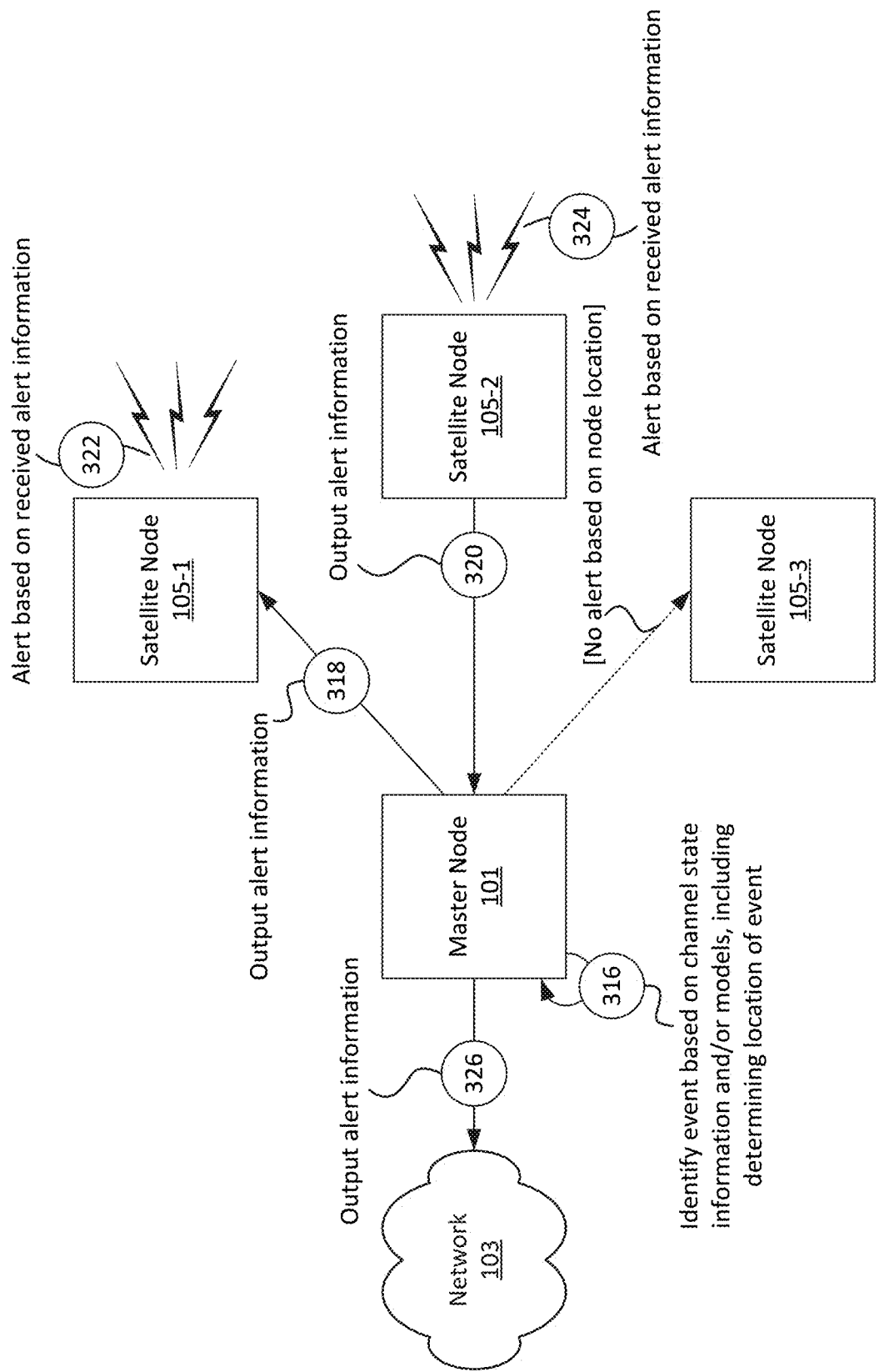
FIG. 3 illustrates an example of generating and/or outputting alerts when an event has been detected, in accordance with some embodiments.

For example, as shown in FIG. 3, master node 101 may detect (at 316) one or more events based on the determined CSI values and/or the models. For example, a given model may be based on CSI values received from some or all of satellite nodes 105. At some point, master node 101 may determine CSI values that significantly deviate from a model of a "normal" state (e.g., a set of CSI values from some or all of satellite nodes 105 in which an individual is not present in the vicinity of satellite nodes 105 and/or master node 101). For example, the RF waveforms as received by master node 101 may differ from the RF waveforms as transmitted by satellite nodes 105 when an individual walks into a room in which one or more satellite nodes 105 are located, where this difference is distinguished from variations in RF waveforms as transmitted by satellite nodes 105 when no individuals are present. In other words, the transmitted RF waveforms may differ from the received waveforms in both scenarios; however, the manner in which the RF waveforms differ may vary based on the presence of an individual.

An amount or duration of the variations, differences, etc. between the CSI values may be used to detect motion, or types of motion. For example, a relatively major variation in CSI values over a relatively brief period of time (e.g., one second) may indicate that an individual has fallen. As another example, differing variations in CSI values over a relatively longer period of time (e.g., 5 minutes, one hour, etc.) may indicate that an individual is present in the room and is moving around throughout the room. As yet another example, a relatively minor variation in CSI values that occurs rhythmically or periodically, over a relatively longer period of time (e.g., 8 hours), during evening or night time, and/or within a room designated as a "bedroom" (e.g., as designated during a registration or pairing process), may indicate breathing of a sleeping individual.

In some embodiments, models that correlate patterns in CSI values may be generated or refined using machine learning, AI, and/or other suitable techniques. In some embodiments, in lieu of master node 101 determining CSI values, generating models, or identifying events based on CSI values and models, master node 101 may provide CSI values and/or raw RF signal information (e.g., via network 103) to one or more other devices or systems, which may perform such determining, generating, and/or identifying. When detecting events (e.g., detecting that an individual has entered or exited a room, detecting that an individual has fallen, detecting an abnormal breathing pattern, detecting that an object has been thrown, detecting that an object has fallen, or other types of motion-based events), master node 101 may output one or more alerts.

For example, one particular satellite node 105 may be plugged into a wall and may be adjacent to a relatively open space within a room. Such placement may facilitate the detection of individuals walking in the room, such as entering or exiting the room, or walking from one point in the room to another point in the room (e.g., to a bed that is located in the room). Additionally, placement of satellite node 105 at or near ground level (e.g., plugged into a wall, mounted to a surface such as a wall or a baseboard, or the like) may facilitate communications with individuals during an emergency event. For example, if an individual has fallen, the placement of satellite node 105 at or near ground level may provide for more accurate voice recognition by satellite node 105 of voice commands from the individual (e.g., requests for help), and may further provide for more recognizable audio from satellite node 105 (e.g., audible alerts).

As another example, another particular satellite node 105 may be situated proximate to a bed (e.g., may be plugged into a wall next to a bed, may be placed on a nightstand next to a bed, etc.). Such placement may be better suited for detecting breathing patterns of an individual who is sleeping on the bed, and may further be better suited for detecting breathing-related motion events, such as if the breathing of the individual significantly increases in intensity or rate, decreases in intensity or rate, becomes intermittent, differs from the individuals' typical breathing pattern, and/or exhibits other anomalies based on which an event may be detected.

In the example of FIG. 3, assume that satellite node 105-1 and satellite node 105-2 are located in the same room, and that satellite node 105-3 is located in a different room. As noted above, the pairing process between satellite nodes 105 and master node 101 may include a determination of particular rooms in which satellite nodes 105 are located. Further assume that, based on sensing signals received by master node 101 (e.g., from satellite node 105-1, satellite node 105-2, and/or satellite node 105-3), master node 101 detects an event in the room in which satellite node 105-1 and satellite node 105-2 are located. For example, master node 101 may detect that an individual has fallen within the room. For example, master node 101 (or other suitable device or system) may compare CSI values to a model associated with the detection of an individual falling and determine, based on the comparison, that the CSI values match or otherwise suitably correspond to the model.

Accordingly, master node 101 may output (at 318 and 320) alert information to satellite node 105-1 and satellite node 105-2 based on determining that satellite node 105-1 and satellite node 105-2 are in the room in which the event was detected, and may forgo outputting alert information to satellite node 105-3 based on satellite node 105-3 being in a different room. In some embodiments, different types of events or alerts may be handled differently. For example, in some situations, if master node 101 detects an event in one room, master node 101 may send alerts to satellite nodes 105 (or other devices) in different rooms, or to all satellite devices 105 that have been paired with master node 101.

The alert information (outputted at 318 and 320) may vary based on type of event, capability information of satellite node 105-1 and satellite node 105-2, and/or other factors. For example, if satellite node 105-1 has a display screen and a speaker, the alert information provided (at 318) to satellite node 105-1 may include an instruction to play an audible alert and/or to present a visual indicator on the display screen. Satellite node 105-1 may accordingly present (at 322) the alert, such as by playing the audible alert and/or presenting the visual indicator. On the other hand, if satellite node 105-2 has a speaker and no display screen, the alert information provided (at 320) to satellite node 105-2 may include audible alert information, based on which satellite node 105-2 may play (at 324) an audible alert.

In some embodiments, master node 101 may also output (at 326) alert information to one or more other devices or systems (via network 103), such as a "smart home" hub, application server, a UE that has been registered as being associated with master node 101 (e.g., a mobile telephone associated with an individual who owns or operates master node 101). In this manner, devices or systems that are not paired with master node 101 (e.g., via a pairing process as described above) may also receive alerts or other information regarding events detected by master node 101. In some embodiments, such alerts may be received or outputted in the form of a Short Message Service ("SMS") message, a Multimedia Messaging Service ("MMS") message, an e-mail, a Voice over IP ("VoIP") call, a system-level "pop-up" alert, and/or some other suitable type of alert.

Figure 4:
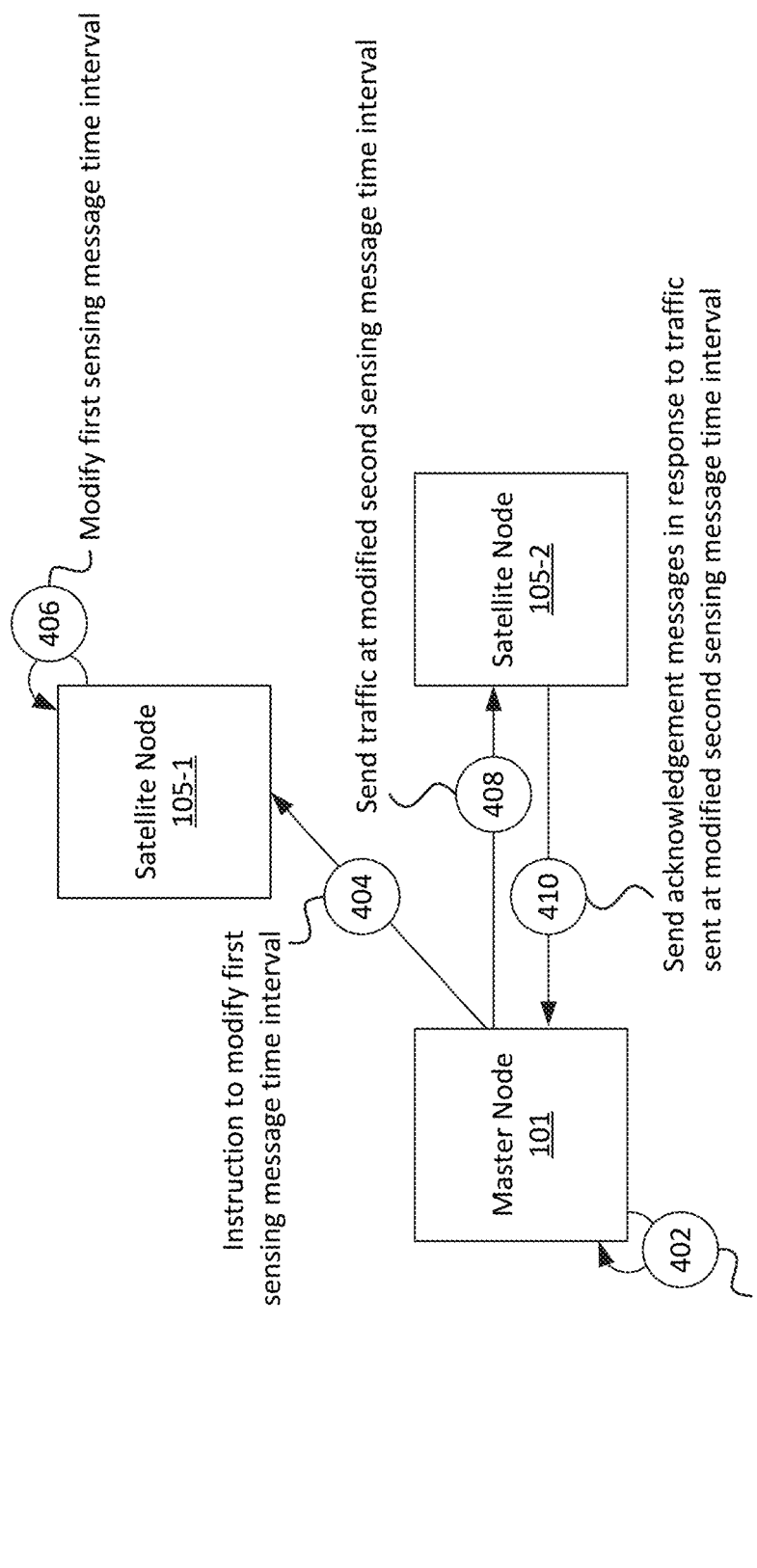
FIGS. 4 and 5 illustrate examples of modifying a sensing interval associated with one or more satellite nodes, in accordance with some embodiments.

In some embodiments, as shown in FIG. 4, master node 101 may determine (at 402) that a sensing interval associated with one or more satellite nodes should be modified. For example, master node 101 may determine that a particular satellite node 105 is not sending sensing signals frequently enough, and/or is sending sensing signals too frequently. In some embodiments, for instance, as noted above, particular satellite nodes 105 may be associated with particular sensing intervals, which may be a static, preset interval and/or may change based on various factors (e.g., based on time of day, based on whether motion has been sensed by one or more satellite nodes 105, a level of motion sensed by satellite node 105 and/or one or more other satellite nodes 105, based on whether a given individual or device is located within a threshold distance of master node 101 or satellite node 105 (e.g., if master node 101 is located in an individual's home and if the individual or a UE associated with the individual is at home), or other factors). For example, master node 101 may receive information (e.g., via network 103) from one or more other devices or systems, indicating that location information for a particular UE, associated with a user who is also associated with master node 101, is at least a threshold distance away from master node 101 (e.g., is not at home). In such situations, master node 101 may determine (at 402) that a sensing time interval associated with one or more satellite nodes 105 should be increased (e.g., fewer signals in a given time period) in order to reduce power consumption. As another example, master node 101 may determine (e.g., based on CSI values determined based on sensing signals from one or more satellite nodes 105) that an individual has entered or exited a particular room, based on which the sensing time interval for satellite nodes 105 in that room should be modified (e.g., increased or decreased, in some embodiments).

In some embodiments, master node 101 may output (at 404) an instruction to a particular satellite node 105 (e.g., satellite node 105-1, in the example of FIG. 4) to modify the sensing message interval at which satellite node 105-1 sends sensing messages to master node 101. For example, master node 101 and satellite node 105-1 may implement an API via which master node 101 may send instructions, and where satellite node 105-1 may perform actions in accordance with the instructions. For example, satellite node 105-1 may modify (at 406) a sensing message time interval, and may proceed to send sensing messages to master node 101 according to the modified time interval.

As another example, master node 101 may send (at 408) traffic to one or more satellite nodes 105 (e.g., satellite node 105-2, in the example of FIG. 4) at a modified sensing message time interval. In some embodiments, the traffic may be "null" traffic, which does not necessarily have any meaningful payload, user traffic, etc. Satellite node 105-2 may, in some embodiments, output (at 410) acknowledgement (or "ACK") messages based on receiving the traffic from master node 101. In this manner, master node 101 may receive sensing messages from satellite node 105-2 on a modified time interval, without explicitly instructing satellite node 105-2 to make any configuration changes, and without communicating with satellite node 105-2 via an API by which master node 101 instructs satellite node 105-2 to make changes per se to the interval at which satellite node 105-2 outputs sensing messages to master node 101.

Figure 5:
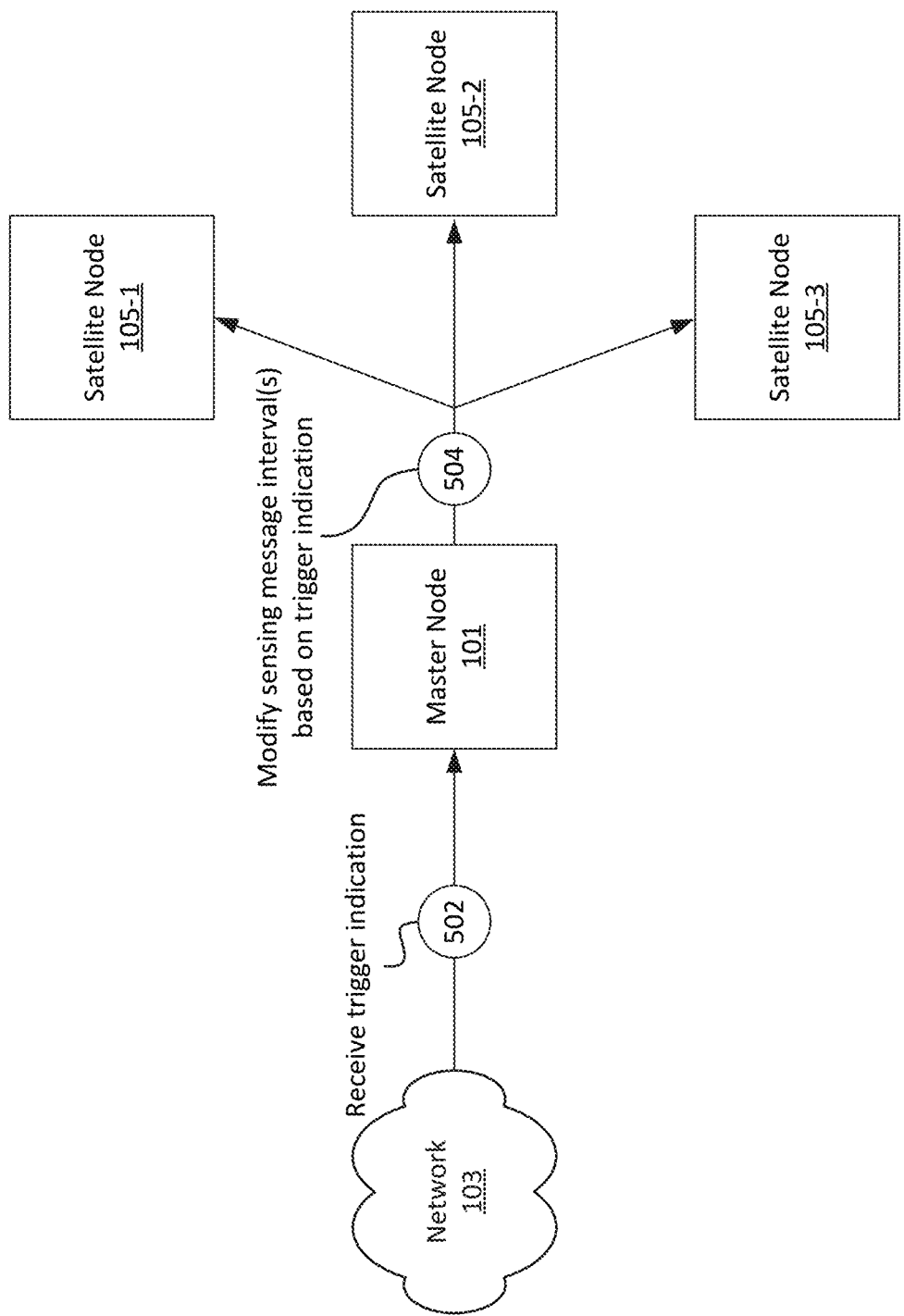

As noted above, master node 101 may determine that one or more sensing message intervals should be changed based on triggers and/or other information received from one or more other devices or systems. For example, as shown in FIG. 5, master node 101 may receive (at 502) a trigger indication via network 103. For example, master node 101 may receive such an indication from a device or system that may receive or maintain information regarding other devices or systems that have some logical relationship to master node 101. For example, master node 101 may receive (at 502) the trigger indication from a device or system (e.g., an application server or other suitable device or system) that a UE associated with a particular user (e.g., a user who is also associated with master node 101, such as an owner or operator of master node 101, a family member, etc.) has left his or her home. As another example, master node 101 may receive an indication that a smart thermostat associated with a building in which master node 101 has been set to a particular temperature. As yet another example, master node 101 may receive an indication that a smart appliance (such as a stove or oven) has been left powered on for greater than a threshold amount of time. In practice, other types of triggers are possible, and may be based on "smart" devices or services, information from IoT devices, etc.

In some embodiments, when determining that certain events or triggers have occurred (e.g., an oven being left on after an individual has left his or her home), master node 101 may provide the alert to a "smart home" hub, application server, and/or other device or system. The alert may indicate parameters associated with the determined event or trigger. For example, the alert may indicate that a trigger was received based on motion sensing by one or more satellite nodes 105 that indicate that an individual has left his or her home, and further based on sensor information from an IoT device or other type of device that an oven is in an "on" state and/or is set to a particular temperature. The "smart home" hub, application server, etc. may accordingly turn off the oven, may set the oven to a lower temperature, etc.

In some embodiments, the trigger indication (received at 502) may indicate one or more sensing message intervals. For example, master node 101 may receive (at 502) an instruction to set sensing message intervals for associated satellite nodes 105 to a particular interval. Additionally, or alternatively, master node 101 may determine sensing intervals based on the trigger indication. For example, if the trigger indication indicates that a particular user is arriving at a location in which master node 101 is located (e.g., based on location information associated with a UE associated with the user), then master node 101 may determine that a sensing message interval should be reduced (e.g., that satellite nodes 105 should send sensing messages more often), and may modify (at 504) the intervals associated with satellite node 105-1, satellite node 105-2, and/or satellite node 105-3 based on the trigger indication. For example, master node 101 may make such modification (at 504) in a similar manner as described above with respect to FIG. 4 (e.g., by instructing a particular satellite node 105 to modify a sensing message interval, and/or by sending messages to satellite node 105 at a rate that corresponds to a modified sensing message interval).

Figure 6:
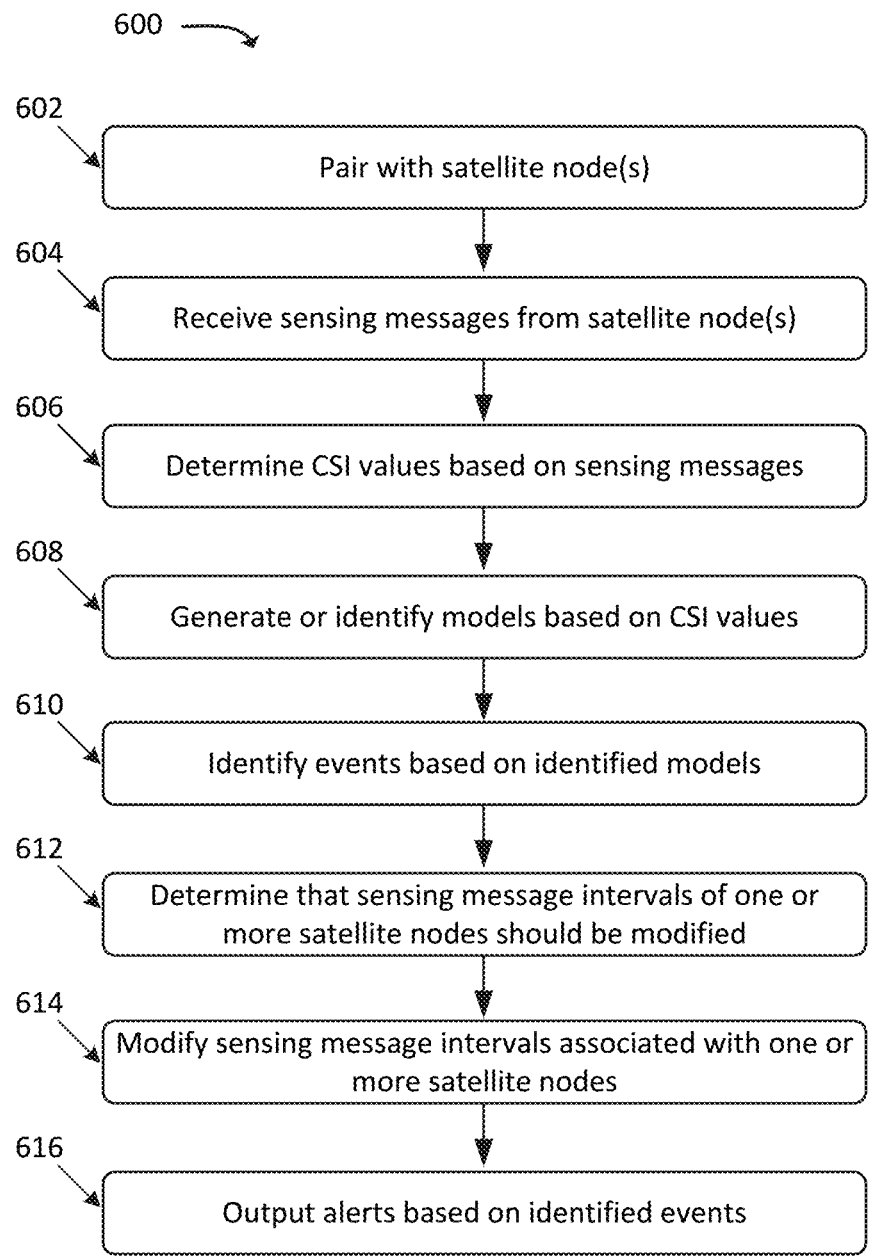
FIG. 6 illustrates a process for detecting events based on sensing signals received from one or more devices, and for modifying intervals at which such sensing signals are sent, in accordance with some embodiments.

FIG. 6 illustrates an example process 600 for detecting events (e.g., motion-based events) based on RF signals (e.g., sensing signals) received from one or more devices (e.g., one or more satellite nodes 105), and for modifying intervals at which such sensing signals are sent. In some embodiments, some or all of process 600 may be performed by master node 101. In some embodiments, one or more other devices may perform some or all of process 600 in concert with, and/or in lieu of, master node 101 (e.g., a "smart home" hub, application server, and/or other device or system).

As shown, process 600 may include pairing (at 602) with one or more satellite nodes 105. For example, master node 101 may pair with one or more satellite nodes 105 that are within communications range of master node 101. In some embodiments, the pairing may include a security mechanism, such as a button press of a physical button on both master node 101 and satellite node 105, or some other type of suitable security or authentication mechanism to ensure that master node 101 and satellite node 105 should properly be paired with one another.

Process 600 may further include receiving (at 604) sensing messages from one or more satellite nodes 105. For example, as discussed above, master node 101 may receive RF signals, such as WiFi signals, from satellite nodes 105. In some embodiments, the sensing messages from a particular satellite node 105 may include information associated with an RF waveform that corresponds to the sensing message as sent by satellite node 105. As discussed above, such information may be provided in a header, a preamble, and/or other suitable portion of the sensing message.

Process 600 may additionally include determining (at 606) CSI values based on the received sensing messages. For example, master node 101 may compare RF waveforms that correspond to the sensing messages as received, to the RF waveforms of the sensing messages as originally sent by satellite nodes 105 (e.g., as indicated in the header information, preambles, etc.).

Process 600 may also include generating and/or identifying (at 608) one or more models based on the CSI values. For example, over a duration of time (e.g., 1 second, 10 seconds, or some other duration of time), master node 101 may determine patterns, anomalies, variations, etc. in the CSI values. Master node 101 may compare such patterns, anomalies, etc. to previously generated models associated with particular events. In some embodiments, master node 101 or some other device or system may refine such models over time using machine learning and/or some other suitable technique (e.g., may refine models based on user feedback or other reinforcing or un-reinforcing types of feedback).

Process 600 may further include identifying (at 610) events based on the identified models. For example, master node 101 may determine that a given set of CSI values, over time, correspond to a given model associated with a particular event, or type of event (e.g., a detection of a person walking, a detection that a person's breathing has slowed or become more rapid, or some other type of motion-based event). In some embodiments, the events may be determined based on CSI values received from and/or aggregated based on CSI values received from multiple satellite nodes 105.

Process 600 may additionally include determining (at 612) that sensing message intervals of one or more satellite nodes 105 should be modified. For example, as discussed above, in some circumstances, master node 101 may determine that sensing messages have not been received from a particular satellite node 105 at an expected rate or interval (e.g., where such satellite node 105 is sending messages too slowly or too rapidly, compared to a threshold or reference rate). As another example, master node 101 may determine that a sensing message rate for one or more satellite nodes should be modified (e.g., increased or decreased) based on identifying (at 610) a motion-based event, and/or based on some other trigger (e.g., as received from some other suitable device or system, which may be based on an alert or event detected by another device or system).

Process 600 may also include modifying (at 614) the sensing message intervals associated with the determined satellite nodes 105. For example, master node 101 may instruct such satellite nodes 105 to increase or reduce a rate at which such satellite nodes 105 output sensing messages. Additionally, or alternatively, master node 101 may modify a rate at which master node 101 outputs messages from satellite nodes 105 to elicit acknowledgement messages (e.g., where such acknowledgement messages serve as sensing messages) from satellite nodes 105.

Process 600 may further include outputting (at 616) alerts based on the identified events. For example, master node 101 may output alerts to one or more satellite nodes 105 and/or to some other device or system. As discussed above, master node 101 may select which satellite nodes 105 to alert based on the type of event. For example, if the type of event is a detection of a person falling, master node 101 may first send an audible alert to a satellite node 105 that is in a same room or is otherwise proximate to the detected falling person (e.g., to inquire as to whether the person requires assistance), and then may send audible alerts to other satellite nodes 105 that are in other rooms, that are less proximate to the falling person, and/or that are proximate to other people (e.g., where master node 101 has detected, based on sensing signals from the other satellite nodes 105, that people are present in the same room as the other satellite nodes 105).

Figure 7:
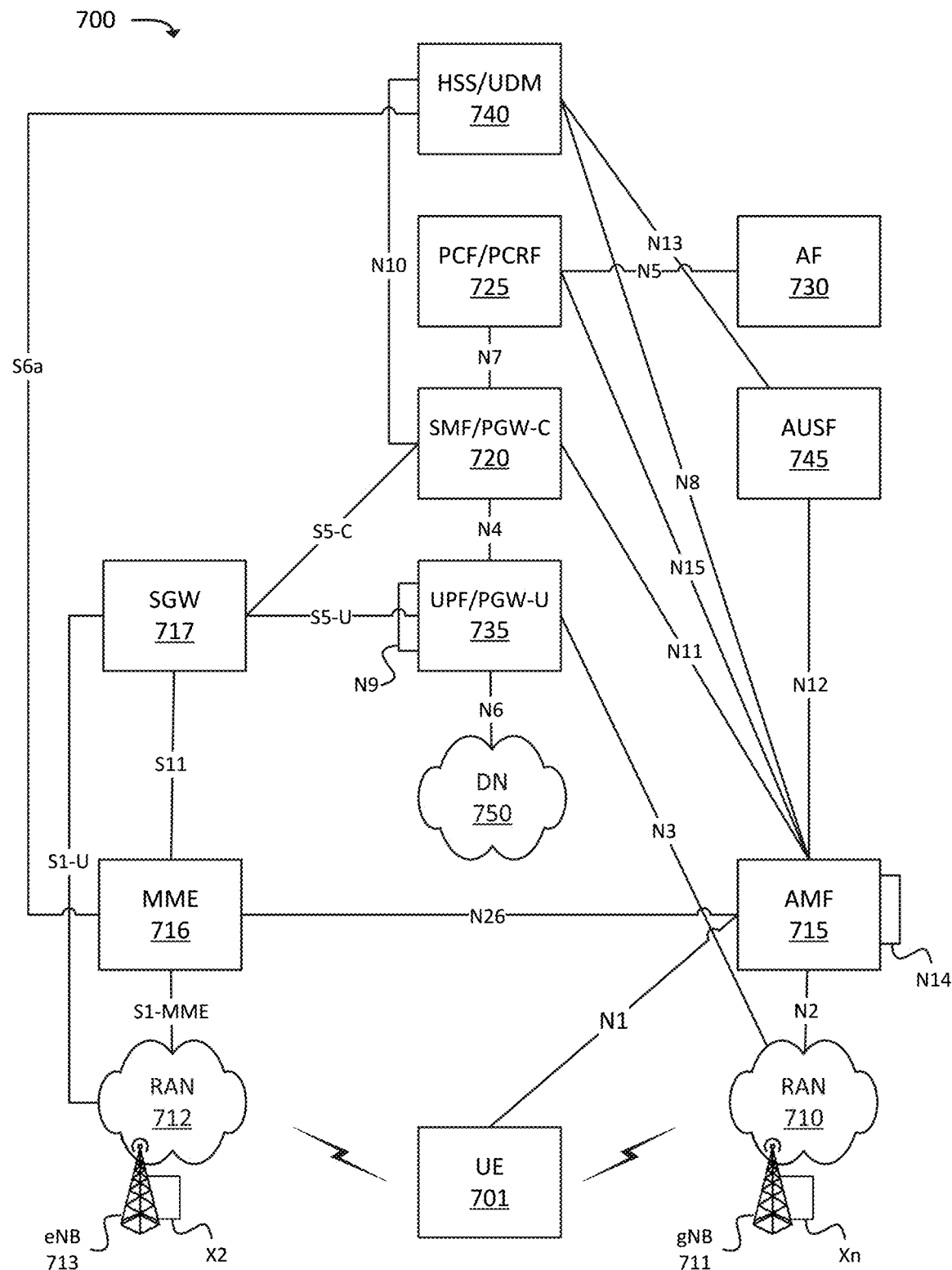
FIG. 7 illustrates an example environment in which one or more embodiments, described herein, may be implemented.

FIG. 7 illustrates an example environment 700, in which one or more embodiments may be implemented. In some embodiments, environment 700 may include, and/or may be an example of, network 103 discussed above. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 701, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an IoT device, a Mobile-to-Mobile ("M2M") device, or another type of mobile computation and communication device. UE 701 may send traffic to and/or receive traffic (e.g., user plane traffic) from DN 750 via RAN 710, RAN 712, and/or UPF/PGW-U 735. In some embodiments, master node 101 and/or satellite node 105 may include, may be implemented by, and/or may be an instance of UE 701.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, SGW 717, and/or one or more other devices or networks) and may communicate the traffic to UE 701 via the air interface.

AMF 715 may include one or more devices, systems, Virtualized Network Functions ("VNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
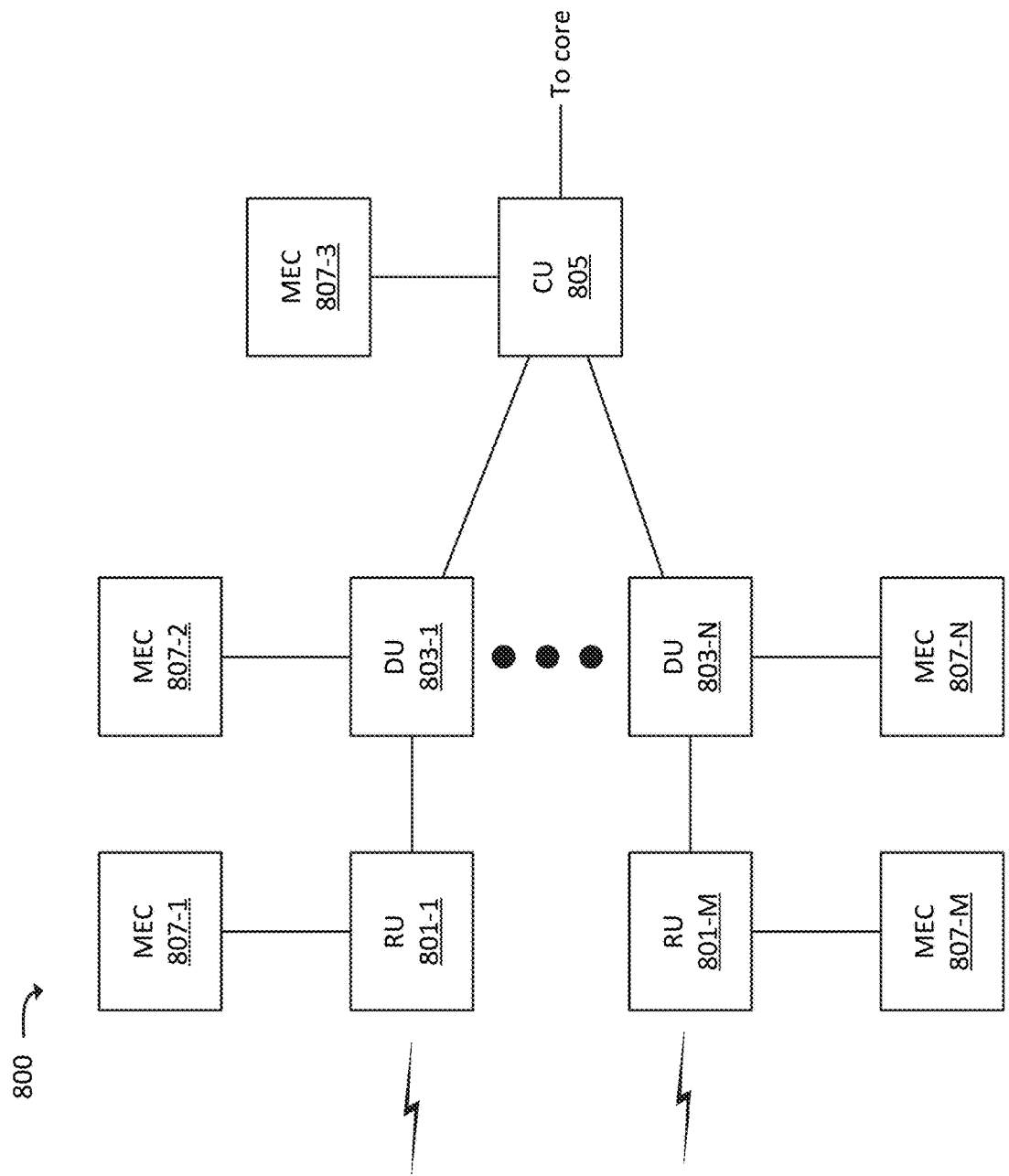
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., PHY layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement some or all of the functionality described above with respect to a "smart home" hub, application server, or the like. In some embodiments, some or all of the functionality associated with master node 101 may be implemented by MEC 807. For example, master node 101 may provide CSI values to MEC 807, MEC 807 may identify one or more events or models based on the CSI values, and may report to master node 101 and/or some other device or system the identified events or models.

Figure 9:
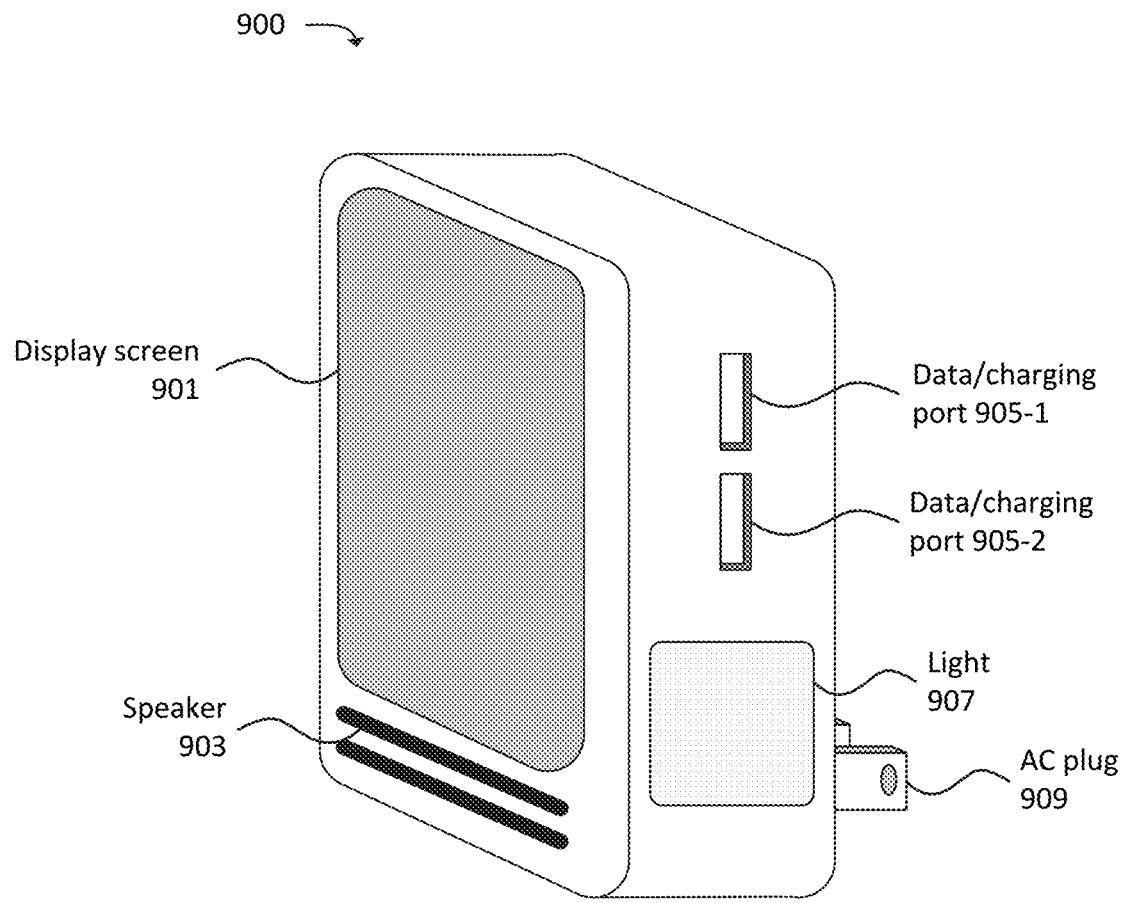
FIGS. 9 and 10 illustrate example components of one or more devices, in accordance with one or more embodiments described herein.

FIG. 9 illustrates example components of device 900. In some embodiments, master node 101 and/or satellite node 105 may include, may be implemented by, may be subsets of, and/or may be instances of device 900. As shown, device 900 may include display screen 901, speaker 903, one or more data/charging ports 905, light 907, and AC plug 909. In some embodiments, device 900 may include additional, fewer, different, or differently arranged components. For example, in some embodiments, device 900 may include one or more audio input components (e.g., microphones).

Display screen 901 may include a display screen, via which visual alerts may be presented (e.g., as described above). In some embodiments, display screen 901 may include a touch screen, in order to facilitate some of the operations described above (e.g., the pairing of master node 101 to one or more satellite nodes 105). Speaker 903 may present audible alerts, in accordance with embodiments described above. Data/charging port 905 may include a Universal Serial Bus ("USB") port or other type of port via which power may be received (e.g., to charge other devices) and/or via which data may be inputted to or outputted from device 900. Light 907 may include a LED or other type of light, via which alerts (e.g., lights with flashing patterns, lights with different colors, etc.) may be visually presented. AC plug 909 may facilitate the receipt of power for device 900 (e.g., from a wall outlet, surge protector, power strip, etc.). While shown in the figure as a two-pronged fixed AC plug 909, in some embodiments, device 900 may receive power via some other suitable type of interface, such as a cable that connects to device 900 and an external power supply. In some embodiments, device 900 may include a battery, capacitor, or other type of power storage and/or delivery component. In some embodiments, AC plug 909 may include foldable prongs, such that device 900 may be laid flat on a surface (e.g., a desk, table, nightstand, floor, bookshelf, etc.) when such prongs are folded. Additionally, in embodiments where device 900 does not include a pronged AC plug 909 (e.g., where device 900 includes a battery and/or a wired power delivery interface), device 900 may also be laid flat on a surface.

Figure 10:
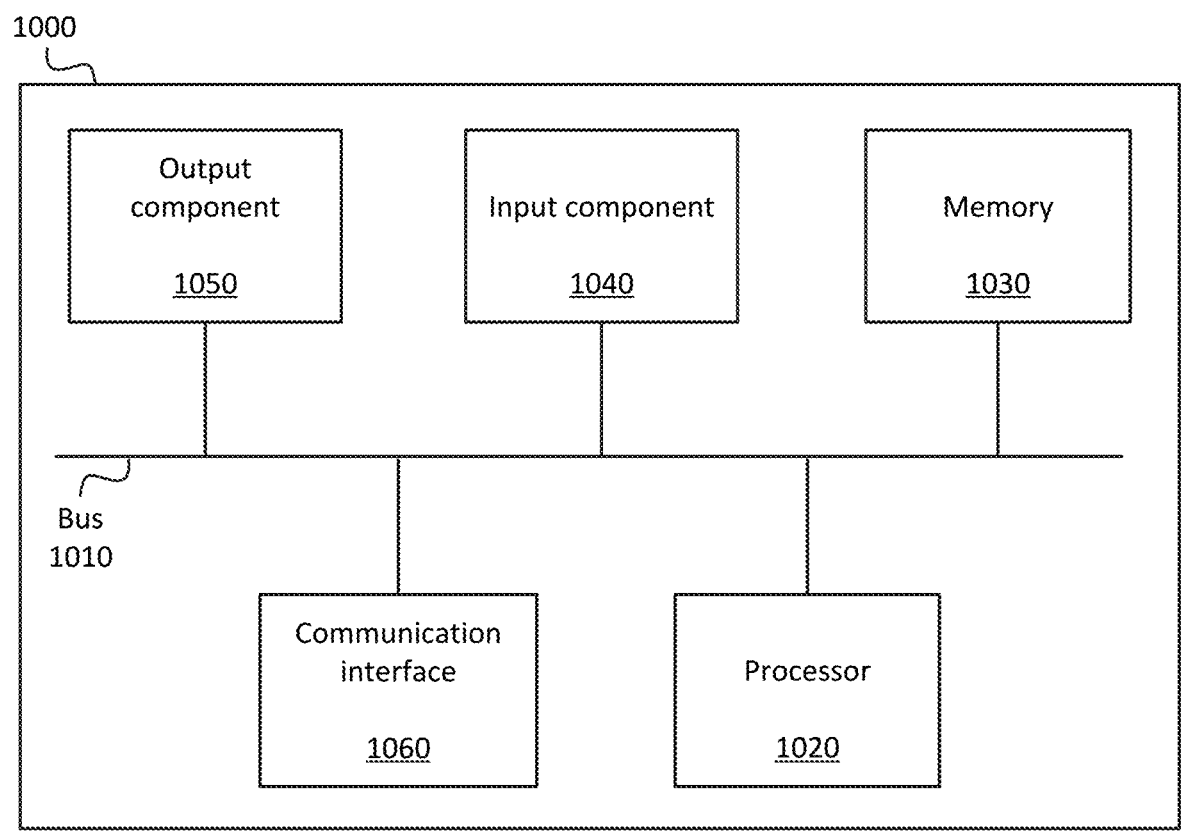

FIG. 10 illustrates example components of device 1000. One or more of the devices described above may include one or more devices 1000. For example, in some embodiments, master node 101 and/or satellite node 105 may include, may be implement by, and/or may be instances of device 1000. As shown, device 1000 may include bus 1010, processor 1020, memory 1030, input component 1040, output component 1050, and communication interface 1060. In some embodiments, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device (e.g., Random Access Memory ("RAM"), processor cache memory, or other dynamic memory) that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
   one or more processors configured to:
   receive a plurality of radio frequency ("RF") signals from a second device over a first duration of time, wherein the plurality of RF signals are received at a first rate;
   identify, from the RF signals, a first set of RF waveforms associated with the plurality of RF signals, the first RF waveforms corresponding to the RF signals as sent from the second device;
   compare the first set of RF waveforms to a second set of RF waveforms, the second set of RF waveforms corresponding to the RF signals as received by the first device;
   determine, based on the comparing, a set of differences between the first set of RF waveforms and the second set of RF waveforms;
   identify an occurrence of a particular event based on the determined set of differences between the first set of RF waveforms and the second set of RF waveforms;
   determine that the first rate should be modified to a second rate; and
   cause, based on determining that the first rate should be modified to the second rate, the second device to output RF signals, over a subsequent second duration of time, at the second rate.

2. The device of claim 1, wherein causing the second device to output RF signals at the second rate includes:
   outputting an instruction to the second device, the instruction indicating the second rate.

3. The device of claim 1, wherein causing the second device to output RF signals at the second rate includes:
   outputting messages to the second device at the second rate, wherein the second device responds to the messages outputted at the second rate.

4. The device of claim 1, wherein determining the set of differences includes determining a set of channel state information ("CSI") values associated with the plurality of RF signals received over the first duration of time.

5. The device of claim 1, wherein determining that the first rate should be modified to a second rate is based on identifying the occurrence of the particular event.

6. The device of claim 1, wherein determining that the first rate should be modified to a second rate includes determining that the first rate is less than a threshold rate, wherein the second rate is greater than the first rate and is greater than or equal to the threshold rate.

7. The device of claim 1, wherein determining that the first rate should be modified to a second rate includes determining that the first rate is greater than a threshold rate, wherein the second rate is less than the first rate and is less than or equal to the threshold rate.

8. A non-transitory computer-readable medium, storing a plurality of processor-executable instructions to:
receive a plurality of radio frequency ("RF") signals from a second device over a first duration of time, wherein the plurality of RF signals are received at a first rate;
identify, from the RF signals, a first set of RF waveforms associated with the plurality of RF signals, the first RF waveforms corresponding to the RF signals as sent from the second device;
compare the first set of RF waveforms to a second set of RF waveforms, the second set of RF waveforms corresponding to the RF signals as received by the first device;
determine, based on the comparing, a set of differences between the first set of RF waveforms and the second set of RF waveforms;
identify an occurrence of a particular event based on the determined set of differences between the first set of RF waveforms and the second set of RF waveforms;
determine that the first rate should be modified to a second rate; and
cause, based on determining that the first rate should be modified to the second rate, the second device to output RF signals, over a subsequent second duration of time, at the second rate.

9. The non-transitory computer-readable medium of claim 8, wherein causing the second device to output RF signals at the second rate includes:
outputting an instruction to the second device, the instruction indicating the second rate.

10. The non-transitory computer-readable medium of claim 8, wherein causing the second device to output RF signals at the second rate includes:
outputting messages to the second device at the second rate, wherein the second device responds to the messages outputted at the second rate.

11. The non-transitory computer-readable medium of claim 8, wherein determining the set of differences includes determining a set of channel state information ("CSI") values associated with the plurality of RF signals received over the first duration of time.

12. The non-transitory computer-readable medium of claim 8, wherein determining that the first rate should be modified to a second rate is based on identifying the occurrence of the particular event.

13. The non-transitory computer-readable medium of claim 8, wherein determining that the first rate should be modified to a second rate includes determining that the first rate is less than a threshold rate, wherein the second rate is greater than the first rate and is greater than or equal to the threshold rate.

14. The non-transitory computer-readable medium of claim 8, wherein determining that the first rate should be modified to a second rate includes determining that the first rate is greater than a threshold rate, wherein the second rate is less than the first rate and is less than or equal to the threshold rate.

15. A method, comprising:
receiving a plurality of radio frequency ("RF") signals from a second device over a first duration of time, wherein the plurality of RF signals are received at a first rate;
identifying, from the RF signals, a first set of RF waveforms associated with the plurality of RF signals, the first RF waveforms corresponding to the RF signals as sent from the second device;
comparing the first set of RF waveforms to a second set of RF waveforms, the second set of RF waveforms corresponding to the RF signals as received by the first device;
determining, based on the comparing, a set of differences between the first set of RF waveforms and the second set of RF waveforms;
identifying an occurrence of a particular event based on the determined set of differences between the first set of RF waveforms and the second set of RF waveforms;
determining that the first rate should be modified to a second rate; and
causing, based on determining that the first rate should be modified to the second rate, the second device to output RF signals, over a subsequent second duration of time, at the second rate.

16. The method of claim 15, wherein causing the second device to output RF signals at the second rate includes:
outputting an instruction to the second device, the instruction indicating the second rate.

17. The method of claim 15, wherein causing the second device to output RF signals at the second rate includes:
outputting messages to the second device at the second rate, wherein the second device responds to the messages outputted at the second rate.

18. The method of claim 15, wherein determining the set of differences includes determining a set of channel state information ("CSI") values associated with the plurality of RF signals received over the first duration of time.

19. The method of claim 15, wherein determining that the first rate should be modified to a second rate is based on identifying the occurrence of the particular event.

20. The method of claim 15, wherein determining that the first rate should be modified to a second rate includes determining that the first rate is less than a threshold rate, wherein the second rate is greater than the first rate and is greater than or equal to the threshold rate.

* * * * *